May 3, 1932. G. C. WOODRUFF 1,856,611
FREIGHT CAR
Filed Feb. 28, 1929 4 Sheets-Sheet 1

Inventor
Graham C Woodruff
By Elwin S Clarkson
Attorney

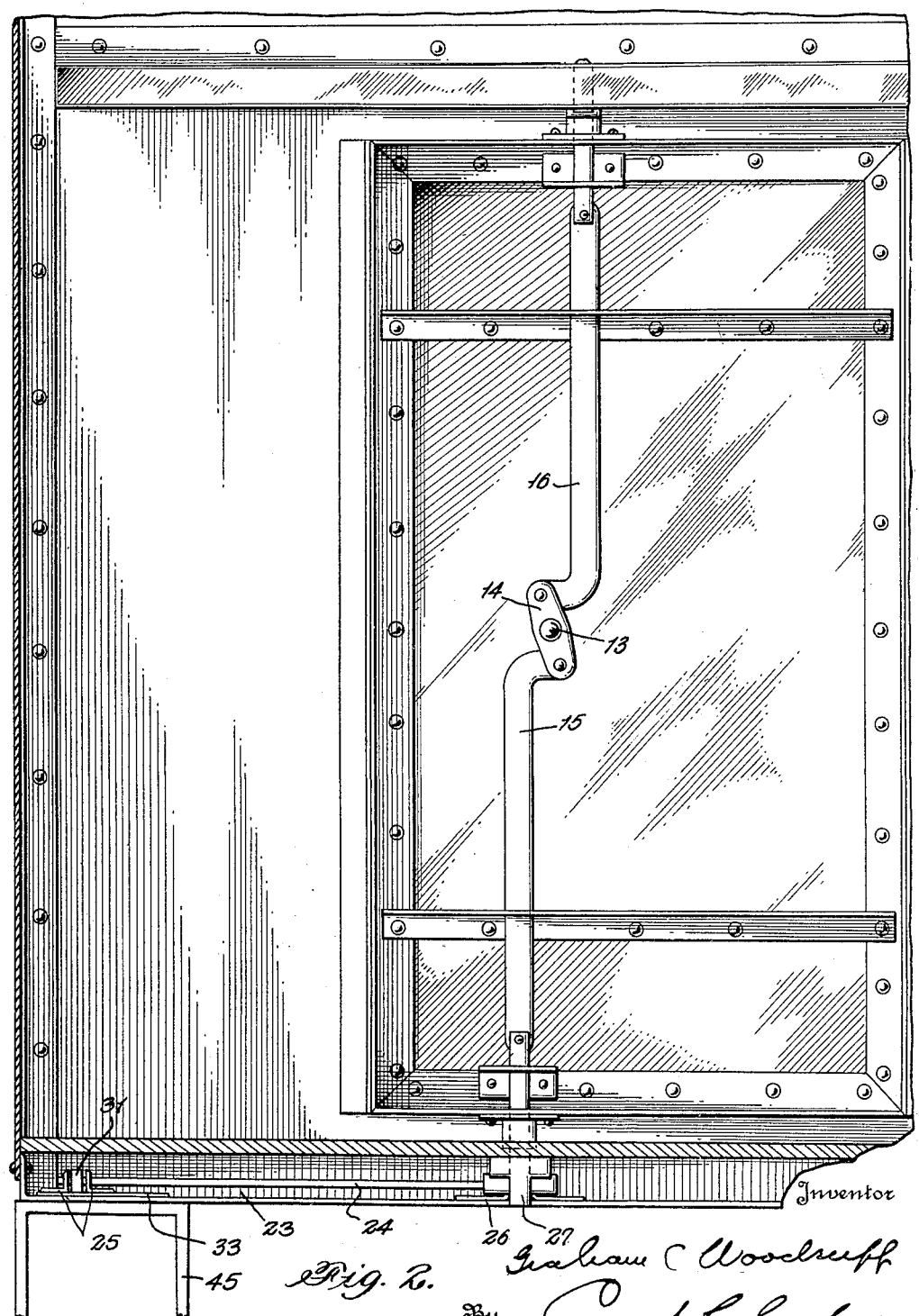

May 3, 1932. G. C. WOODRUFF 1,856,611
FREIGHT CAR
Filed Feb. 28, 1929 4 Sheets-Sheet 3
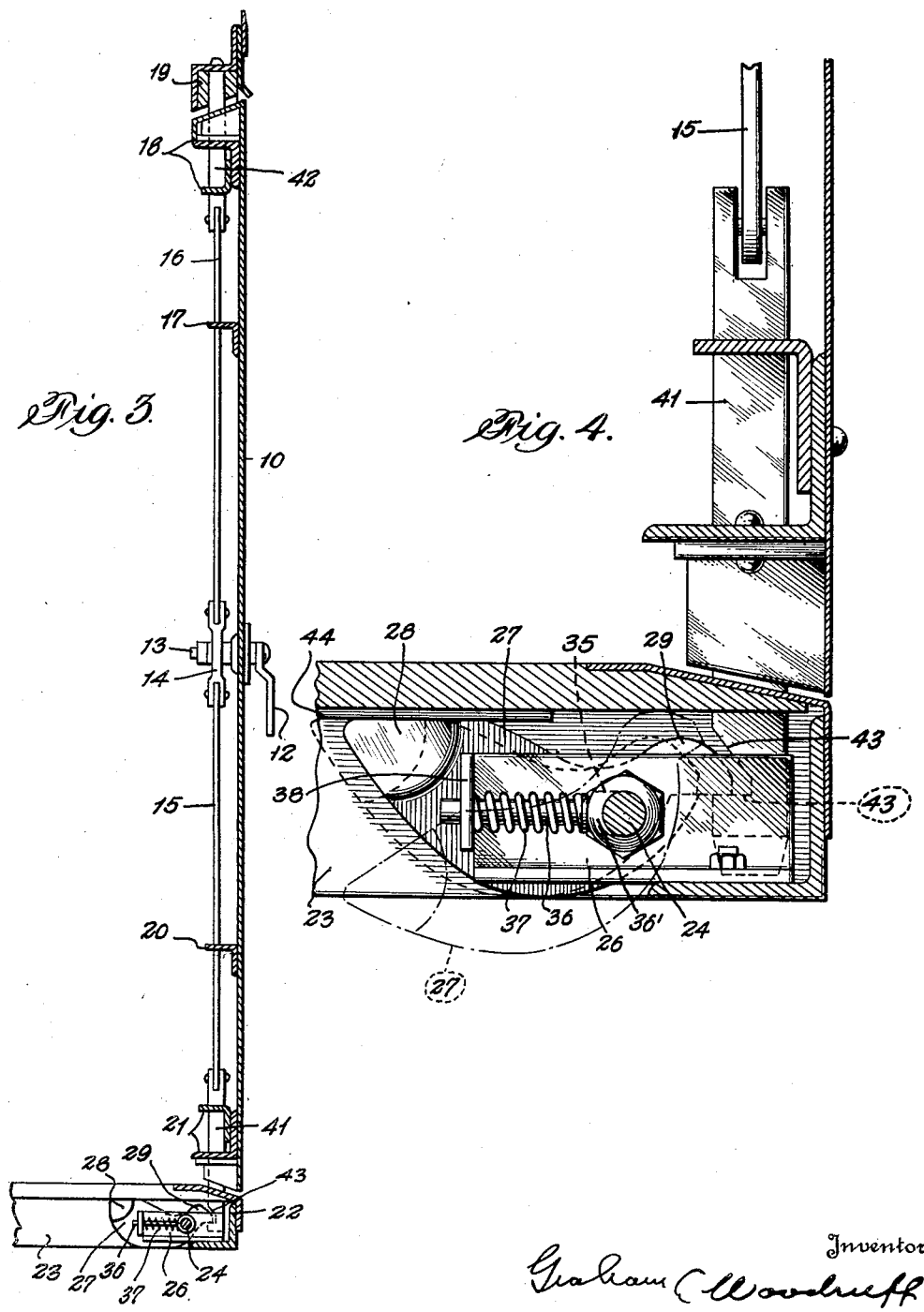
Inventor
Graham C. Woodruff
By Edwin S. Clarkson
Attorney May 3, 1932. G. C. WOODRUFF 1,856,611
FREIGHT CAR
Filed Feb. 28, 1929 4 Sheets-Sheet 4
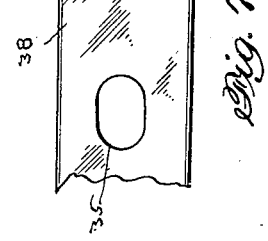
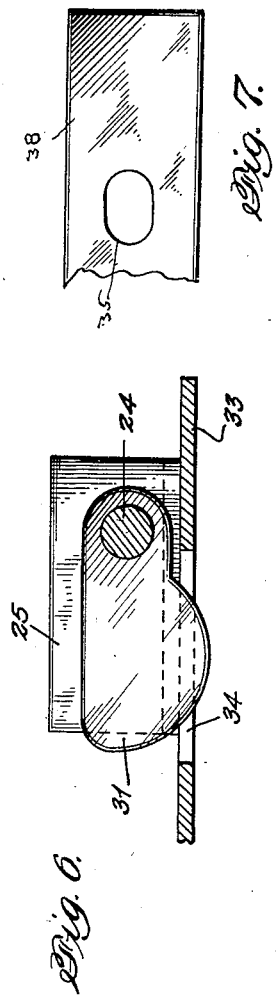
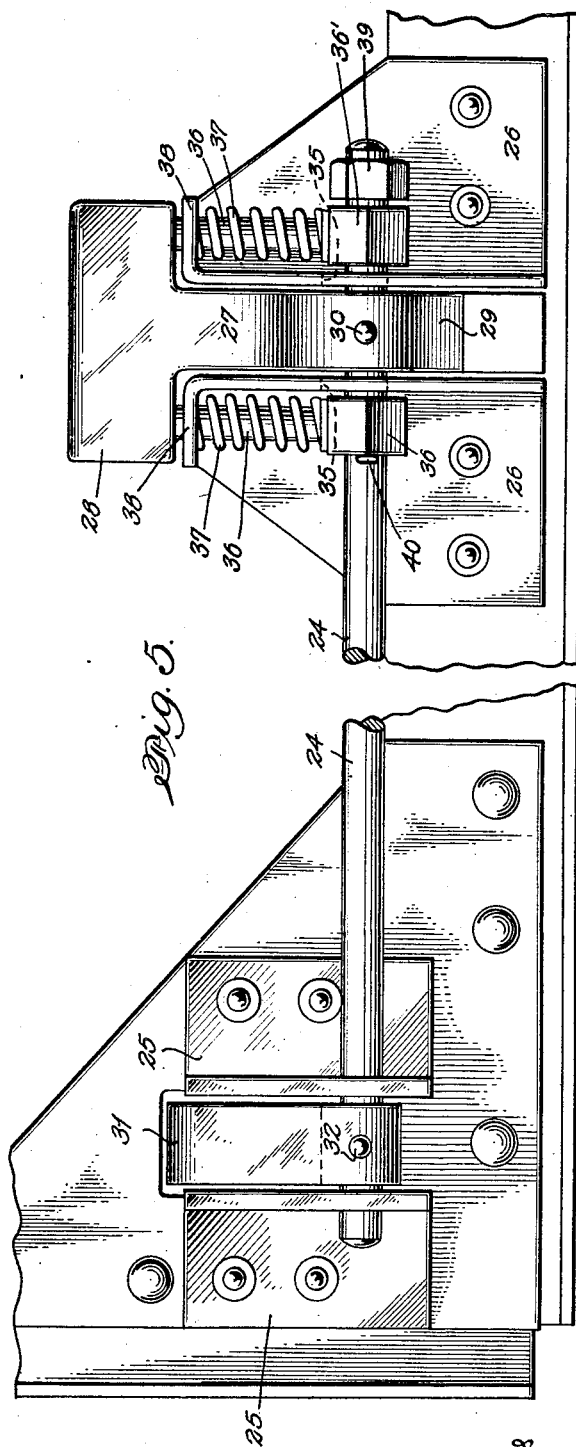
Inventor
Graham C. Woodruff
By Edwin S. Clarkson
Attorney Patented May 3, 1932

1,856,611

UNITED STATES PATENT OFFICE

GRAHAM C. WOODRUFF, OF BRONXVILLE, NEW YORK, ASSIGNOR TO THE L. C. L. CORPORATION, A CORPORATION OF DELAWARE

FREIGHT CAR

Application filed February 28, 1929. Serial No. 343,353.

This invention is an improvement on freight containers of the general type shown in the patents to Alfred H. Smith, as for instance reissue patent No. 16,073, May 19, 1925.

For many years past the methods (except that shown in the Smith patents) of handling merchandise freight have not been changed to any marked degree, in that packages of various kinds, shapes and sizes have been tendered at the railroad platform, taken by railroad labor after unloading from the shipper's truck and either directly loaded into a car, or, more frequently, placed upon the freight house floor, then trucked to the car for relatively long distances and stowed in the car. Due to the usual limitations in available extra space, particularly at larger terminals, in many instances the freight must be loaded currently as offered, into the car, which often resulted in an ill-assorted and badly loaded car, because it was not possible to reassort and properly load the freight to the best advantage. The container car eliminated many of these objections.

In the use of the container car in which the container is loaded back of the rigid side wall of the car it is necessary to have cranes to load and unload the containers from the car and as many stations are not equipped with cranes the use of such containers is limited to crane stations, besides which such containers were not proof of pilfering while on a platform.

The object of my invention is to provide a freight container which is proof against pilfering whether it is resting on a car, a platform, a truck or other support and consequently these containers may be used on a flat car or in a drop side car and still be proof against pilfering; and with this and other objects in view my invention consists of the parts and combination of parts hereinafter pointed out.

In the drawings

Figure 2 is a vertical transverse section of my container looking toward the inner face of the door.

Figure 3 is a vertical section of the door of the container and the threshold plate, the locking mechanism being in elevation.

Figure 4 is an enlarged detail sectional view of the threshold plate and container floor at the bottom of the door.

Figure 5 is an enlarged detail view of a portion of my improved lock.

Figure 6 is an enlarged detail side elevation of one of the locking elements.

Figure 7 is a detail view.

Figure 1:
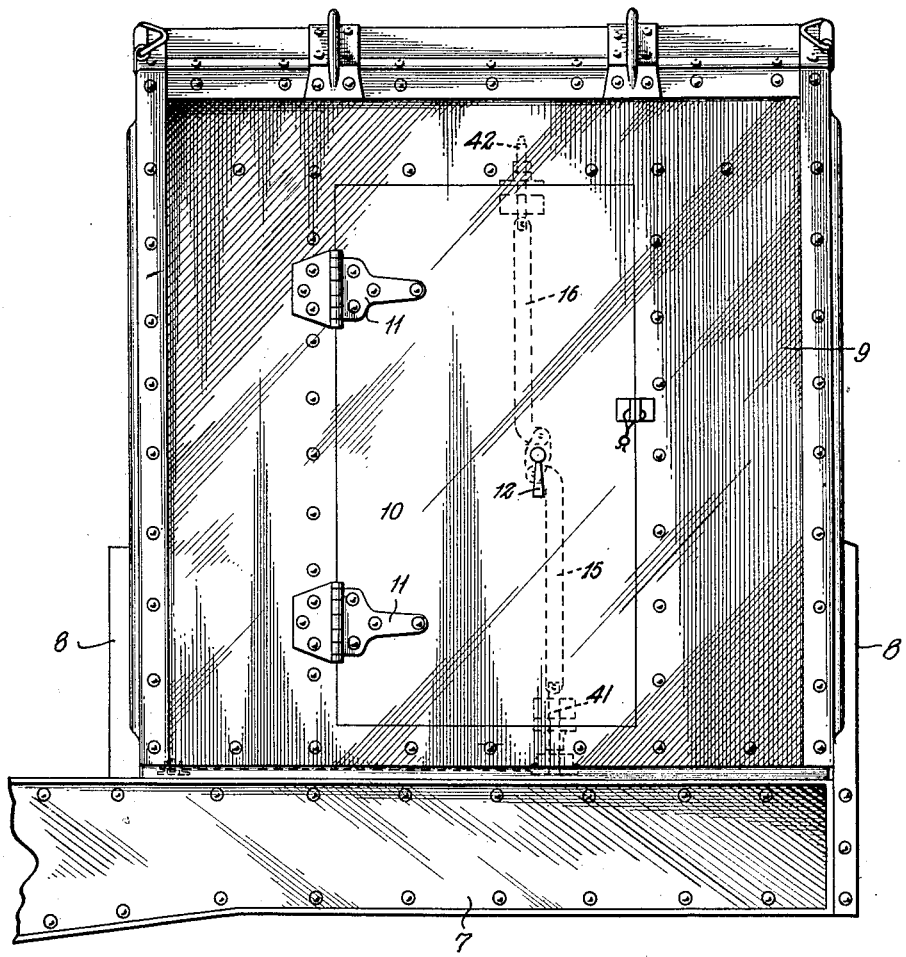
Figure 1 is a side elevation of a portion of a railroad car with one of my improved containers mounted thereon.

The reference numeral 7 designates a car of any approved type, which may be provided with container spacing or retaining devices 8 of any approved type but preferably of such a construction that will prevent the containers 9 from shifting on the car or tilting under service conditions while the car is moving. The containers may be of any approved construction and are provided with doors 10 mounted on the hinges 11. The doors are provided with a lock operating handle 12 mounted on a spindle 13 revolubly secured to the door, to which spindle is rigidly secured a link 14. Locking bolts 15, 16, are pivotally secured at their inner ends to the link 14 and are thus reciprocated whenever the handle 12 is operated under certain conditions. The upper bolt 16 passes through a guide 17 and through the door structure 18 at the upper edge of the door and is adapted, when operated, to engage the keeper 19 positioned inside of the container above the door opening. The bolt 15 passes through guide 20 and through the door structure 21 at lower edge of the door, and when operated engages the keeper 22 formed inside of the container all of which is clearly shown in the drawings.

In order that the door 10, on the merchandise container 9 may be locked in such a manner that the lock cannot be operated while the container is resting on a car floor, station platform, or the supporting shelves of a car, or on a truck body arranged so that containers can be handled by a lift type truck I provide the following mechanism.

The walls of the container extend below the container floor as designated by the reference numeral 23 and constitute sills, thus there is a space between the container floor and the support on which the container rests. In this space, below the container floor, I pivotally mount a rod 24 in suitable pivot rod support angles 25, and 26, these supports being arranged (preferably) in pairs, the supports in each pair being placed apart as clearly seen in Figures 2 and 5.

The dog 27 is keyed at 30 to the rod 24 between the supports 26 and provided with a weighted end 28 and with a nose 29 at its other end. At the other end of the rod 24, I secure a weighted auxiliary dog 31 secured to the rod by means of the rivet 32, between the supports 25, (see Fig. 5) there being a flange or corner gusset 33 having an opening 34 through which the dog 31 operates.

The rod supports 26 are provided with elongated slots 35 in which the rod 24 is rotatably mounted and is free to slide the length of the slot. Spring plungers 36 are mounted on the rod 24 around the stems of which are mounted coiled springs 37, one end of which is seated against the head of the plunger while the other end is seated against the flange 38 integral with the bracket 26, which has an opening through which one end of the plungers move. These plungers and springs hold the rod 24 and dog 29 in normal locking position. The rod 24 and spring plungers are held from shifting laterally by the nut 39 and the cotter pin 40.

It will be seen that the bolt 15 has an extension 41 pivoted to its lower end to compensate for the arcuate movement of the end of the bolt following the movement of the link 14; and that the bar 16 has similar extension 42.

When the container is resting on a car floor, station platform, or truck platform, and the container door with its locking bolts are in closed position, the underside of the dog 27 comes in contact with the supporting floor, thereby securely holding the nose 29 of the locking dog in the recess 43 of the locking bolt 15, making it impossible to raise the bolt and open the door as long as the container is resting on the support, or platform.

In order to release the bolt 15 the container must be elevated from its supporting floor, permitting the end 28 of the dog 27 to drop down by gravity into the normal release position shown by dotted lines in Figure 4. With the dog in this position, the locking bolts 15 and 16 can be withdrawn, and the container door opened.

Should anyone wish to close the container door with the container resting on a supporting floor or platform, this can be done by operating the door locking mechanism and forcing the bolts 15 and 16 into locked position. The dog 27 will, of course, be in the locked position with its underside against the supporting floor and upper side against the wear plate 44.

To prevent the opening of the container door when the container is resting on supporting shelves 45 on a car, station platform or truck body, and there is no supporting floor to contact the dog 27 and hold it in closed position, an auxiliary locking dog 31 has been provided at the corner of the container beneath the floor and enclosed by the container sills 23.

This auxiliary dog 31 is as stated keyed to the rod 24. The slot 34 is provided in the gusset 33 to permit the under side of the auxiliary dog 31 to come in contact with the supporting shelf 45 upon which the side sill of the container rests, thereby holding the bolt 15 in closed position by means of the rod 24 and the dog 27.

In order to release the bolt 15, the container must be elevated from its supporting shelves, permitting the end of the auxiliary dog 31 to drop down by gravity through the slot 34, thereby turning the rod 24 and disengaging the nose 29 of the dog 27 from the recess 43 in the locking bolt 15 permitting the withdrawal of the bolt 15.

From the above it will be seen that my improved container can also be used on a drop side car and that the dropping of the side of the car will not in any manner reduce the security of the container against pilfering.

What I claim is:

1. In combination, a flat support, a plurality of containers on said support, a door for each of said containers and means carried by each container operated on contact with the container supporting face of said support for holding the door thereof locked so long as the container remains on said support.

2. In combination, a support, a container removably mounted on the support, a door for the container, a lock for said door, and means carried by the container operated by contact with the container supporting face of said support to hold the door lock against operation so long as the container remains on the support.

3. In combination, a support, a container removably mounted on the support, a door for the container, a lock for the door, and means carried by the container operated by contact with the container supporting face of said support to automatically lock the door lock against operation in the act of depositing the container on the support.

4. In combination, a support, a container removably mounted on the support, a door for the container, a lock for the door, and means carried by the container operated by contact with the container supporting face of said support to automatically lock the door lock against operation in the act of depositing the container on the support and which releases the door lock for operation when the container is lifted from said support.

5. The combination with a container of the kind described, and a door for said container, of a lock for the door of the container, means carried by the container for locking the door lock against operation while the container is resting on a support and an auxiliary means to lock the door lock against operation when the container is supported only at its side portions.

6. The combination with a container of the kind described, and a door for said container, locking bolts for the door of the container one of which extends through and below the floor of the container, means carried by the container below its floor, which is moved into locking engagement with the bolt below the container floor when the container contacts with the container supporting face of support, thereby holding the door bolt against movement so long as the container remains on the support.

7. The combination with a container of the kind described, and a door for said container, locking bolts for the door of the container, one of which projects below the floor of the container, means carried by the container below the floor thereof, which is moved into locking engagement with the bolt below the container floor when the bottom of the container is in engagement with a support and an auxiliary means to move the first named means into locking engagement with said bolt when the container is supported at its sides on a support, whereby the door locking bolts cannot be operated so long as the container rests on either of said supports.

8. In a container of the kind described, a door for said container, locking bolts for the container door one of which extends below the floor of the container, a locking dog pivotally mounted below the floor of the container and adapted to interlock with the locking bolt below the container floor, and means operated by the contact between the container and the supporting face of a support to move the dog into locking engagement with the said bolt and maintain such engagement so long as the container rests on said support.

9. In a container of the kind described, a door for said container, locking bolts for the container door one of which extends below the floor of the container, a locking dog mounted below the container floor and adapted to interlock with the locking bolt below the container floor, a yieldable mounting for said dog, means operated by the contact between the container and a support to move the dog into interlocking engagement with said locking bolt and maintain such engagement so long as the container rests on such support; said yieldable mounting permitting the closing and locking of the door of the container while the container rests on the support.

10. The combination with a container of the kind described, a door for the container, locking bolts for the door one of which projects below the floor of the container, a dog adapted to interlock with said bolt below the container floor, a yieldable mounting for said dog to hold it in a normal operative position, means to move the dog into locking engagement with said bolt when the container is placed on a support, and auxiliary means connected with said mounting and also adapted to move and hold the dog in locking engagement with the said door bolt so long as the container rests on a support.

11. The combination with a container of the kind described having a door, locking bolts for said door one of which projects below the container floor, a rod rotatably mounted in supports below the container floor, one end of the rod being movable at substantially right angles to its axis, a yieldable mounting for the said movable end of the rod, a dog on the rod, and an auxiliary member rigidly mounted on the other end of the rod, whereby contact of the bottom of the container with a support operates either or both the dog and auxiliary member to move the dog into interlocking engagement with the door bolt and hold the door bolt against operation so long as the container rests on said support.

12. The combination with a container of the kind described, a floor for the container positioned at a point above the bottom of the walls of the container, a door for the container, locking bolts for said door one of which projects below the said floor, a bracket secured to the container below the said floor, a rod rotatably mounted on said bracket and movable thereon at right angles to its axis, spring plungers connected to said rod, and said brackets, a dog keyed to said rod, said dog being moved into locking engagement with said door bolt by contact of the bottom of the container with a support and holding the door bolts against movement so long as the container rests on the support.

13. The combination with a container of the kind described, a floor for the container positioned above the bottom edges of the container walls, a door for the container, locking bolts for the container door one of which projects below said floor, a bracket secured to the container below the said floor, a rod rotatably mounted on said bracket and movable thereon at right angles to its axis, spring plungers connected to said rod and bracket, a dog keyed to said rod, an auxiliary operating means for said dog mounted on the other end of said rod, whereby the placing of the container on a support operates the dog into locking engagement with the said door bolt and such engagement is maintained so long as the container rests on the support.

14. The combination with a container having a floor above the bottom edge of its walls, a door for the container, locking bolts for the door of the container one of which projects through and below said floor, a bracket secured to the container below said floor, a rod rotatably mounted in the bracket and movable at right angles to its axis, a locking dog keyed to said rod, spring plungers secured to said rod and bracket, the other end of the rod being rotatably mounted in a bracket also secured to the container and a weighted dog keyed to this other end of the rod, whereby when the bottom of the container or the side portions of the bottom of the container contact with a support the dog is moved into locking engagement with the door bolt and such engagement is maintained so long as the container rests on the support.

In testimony whereof I affix my signature.

GRAHAM C. WOODRUFF.